Figure 1:
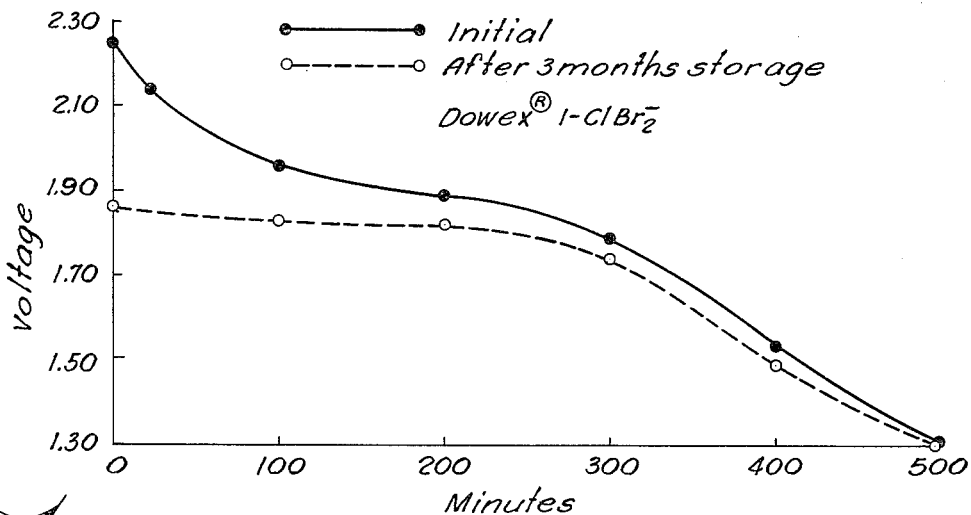

INVENTORS.
Jack F. Mills
Roy C. Kirk
BY Theodore Post
ATTORNEY

INVENTORS.
Jack F. Mills
Roy C. Kirk

BY Theodore Post
ATTORNEY

United States Patent Office 3,231,427
Patented Jan. 25, 1966

3,231,427
PRIMARY CELLS UTILIZING ORGANIC DEPOLARIZER
Roy C. Kirk and Jack F. Mills, Midland, Mich., assignors to The Dow Chemical Company, Midland, Mich., a corporation of Delaware
Filed June 4, 1962, Ser. No. 200,611
17 Claims. (Cl. 136—83)

This application is a continuation-in-part of U.S. patent applications Serial Nos. 60,943 and 60,944 both filed October 6, 1960, now abandoned.

This invention concerns primary cells, and, more particularly, new and improved organic depolarizers for use in such cells.

Modern electronic devices place a continuing demand on battery technology for higher performance and lower costs. A primary dry cell which is to be used as a portable power supply should have the following characteristics: a high watt-hour capacity per unit volume and weight; a high flat operating voltage over a wide range of current drains; and good shelf life. It is further desirable in times of national emergency that the raw materials be non-strategic and readily available in large quantities.

In addition, certain physical and chemical properties of a dry cell cathode material (depolarizer) such as solubility, stability, physical form, and reactivity in the electrolyte are important in determining its usefulness.

Accordingly, an object of the present invention is to provide primary dry and reserve cells, the former of which have a high watt-hour capacity per unit weight and volume, and have a relatively high flat operating voltage level over a wide range of current drains and the latter of which have an indefinite shelf life until water or aqueous electrolyte is added to give a primary dry cell.

A further object is to provide an improved electrochemical system which may be employed for dry cells.

Another object is to provide improved dry cells with materials which are non-strategic and can be readily available in large quantities.

A further object is to provide dry cells capable of high rate discharge with high capacity and a relatively flat discharge curve.

Still a further object is to provide primary reserve cells capable of being activated by addition of water alone.

In general, the foregoing objects as for the novel primary dry cells are accomplished by employing as components thereof a consumable metal anode of magnesium alloy or aluminum, an aqueous electrolyte, a corrosion inhibitor, e.g., a soluble chromate, and, if desired to adjust conductivity, a salt such as $MgBr_2$, in conjunction with a novel organic cathode depolarizer whose oxidizing properties are due to the presence of a trihalide ion $XY_2$, i.e., a complex between a halide anion X ($Br^-$, $Cl^-$, $I^-$ or $F^-$) and $Y_2$, wherein $Y_2$ is $Br_2$ or $I_2$. A carbonaceous material, e.g., acetylene black, is used together with the depolarizer to increase conductivity.

As for the novel primary reserve cells, there are employed as components thereof a consumable metal anode of magnesium or aluminum, a conventional carbon cathode collector, a corrosion inhibitor, such as a water-soluble chromate, and, if desired to adjust conductivity, a salt such as $MgBr_2$, in conjunction with a novel organic cathode depolarizer whose oxidizing properties are due to the presence of a polyhalide ion $XY_n$, i.e., a complex between a halide anion, X ($Br^-$, $Cl^-$, $I^-$ or $F^-$) and $Y_n$, wherein Y is a halogen of the group consisting of chlorine, bromine and iodine, and wherein $n$ is 2 or 4, so that the molecular ratio of such halogen to halide anion is 1 to 2. A carbonaceous material, e.g., acetylene black, is used together with the depolarizer to increase conductivity.

The reserve cells are activated by the addition of water or an aqueous solution of an electrolyte.

Suitable cathode depolarizers are those quaternary ammonium compounds which conform to the general formula $R_4N^+$ $(XY_n)^-$ where one R is a polymeric vinylbenzyl group or an alkyl, aryl, or aralkyl substituent containing up to 20 carbon atoms and the remaining R's are alkyl substituents having up to 4 carbon atoms, X is $F^-$, $Cl^-$, $Br^-$ or $I^-$, Y is Br or I and $n$ is 2 for dry cells and 2 or 4 for reserve cells. In practice, any of these polyhalides usually is a technical mixture containing some variation in ratio of halogen to halide, which may include a small amount of halide ion with no complexed halogen. When tetraalkylammonium polyhalides are used, particularly for reserve cells, those containing a total of 4 to 10 carbon atoms are preferred since they are readily activated by water or an aqueous solution of an electroylte.

For the sake of stability and other practical battery considerations, it is desirable that the depolarizer have a relatively low solubility in water. This is readily achieved by increasing the molecular weight of the depolarizer. For this reason, at least one of the R groups of the quaternary should be an organic group of relatively high molecular weight, as indicated. Particularly advantageous in this respect are the polymeric trihalide anion resins, derived from the prototype polyvinylbenzyl trialkylammonium chloride, the alkyl groups containing from 1 to 4 carbon atoms, its homologs and analogs, crosslinked with about 0.5 to 16 weight percent of a diethylenically unsaturated crosslinking agent, e.g., diacrylic and dimethacrylic acid esters of polyhydric alcohols, dialkenyl esters of dicarboxylic acids, and divinyl aryl hydrocarbons.

Exemplary of the non-resinous organic quaternary ammonium polyhalides which have been used successfully are the tetraalkylammonium trihalides wherein the alkyl groups preferably have a total of up to 20 carbon atoms, and preferably 4 to 10 carbon atoms, and may be the same or different and wherein the trihalide is $XY_2^-$, as indicated above, and the corresponding aralkyl(trialkyl)ammonium polyhalides. Of the polyhalides, the $-ClBr_2^-$ and the $-Br_3^-$ are preferred. For maximum high drain properties and good shelf life, it is preferred to have a total of 8 to 12 carbon atoms in the tetraalkylammonium trihalides.

It has been found, in connection with this invention, that when batteries are assembled and tested employing either or both of the above types of trihalide depolarizers in conjunction with a consumable metal anode, preferably a magnesium alloy anode, a flat discharge curve is obtained at a level in excess of 2 volts per cell over a wide range of current drains.

The polyhalide compounds are conveniently prepared by reacting a quaternary halide, whether polymeric or not, with a halogen, e.g., $Br_2$ or a polyhalogen, e.g., BrCl, $ICl_3$, etc. in amount sufficient to form the polyhalide. This type of reaction has been known since at least 1923, when Chattaway and Hoyle, as reported in J. Chem. Soc. 123, I 654 (1923), studied the addition products of halogen and quaternary ammonium salts and found that tetramethylammonium bromide forms a stable compound with bromine corresponding to the composition $(CH_3)_4NBr \cdot Br_2$, containing 51 percent available bromine and melting at 118.5° C. Other investigators, Bowen and Barnes: Chemistry & Industry 1945, 254 and Block, R., Farkas, L., Schnerb, J., and Winogron, F.: J. Phys. & Colloid Chem. ;53, 1117 (1949), have reported other compounds containing as high as 94 percent available bromine attached to tetramethylammonium bromide, 75 percent $Br_2$ attached to tetraethylammonium bromide, and 85 percent $Br_2$ attached to tetramethylammonium chloride. This type of compound was also the subject of German Patent 694,408, issued in 1940. For the purposes of this invention, both the tri- and pentahalides are operable in reserve cells since they alone can be activated by the addition of water or an aqueous solution of an electrolyte, and have good shelf life in the dry state, whereas only the trihalides have the stability necessary for commercial dry cells.

The dry cell batteries of this invention perform particularly well at high drains (1–30 min. rates). A comparison with a commonly used high drain system has been made herein. The most widely used system in this area, e.g., in flashlight batteries, is the Zn—$MnO_2$ system. The preferred Mg alloy trihalide batteries have a number of distinct advantages over the Zn—$MnO_2$ cells:

(1) A much higher operating voltage—2.0 vs. 1.5;
(2) A flatter discharge curve;
(3) The ability to perform well at very high drains.

None of the commercially available dry cells, such as the Zn—$MnO_2$ (Leclanché) and the Zn—HgO, are very good at high drain rates. An alkaline Zn—$MnO_2$ cell was recently put on the market offering improved high drain properties, but the special construction makes it extremely expensive. In order to minimize polarization of the Zn anode, powdered Zn was used, thus increasing the area and decreasing the current density for a given drain. The dry cell system of this invention has the advantages of requiring only conventional construction and less strategic materials, plus offering a higher and flatter voltage curve and more watt-hours per pound at high rates of discharge.

The reserve cells of this invention are also particularly advantageous in performing well at high drains. The most widely used system in this area, e.g., in missile batteries, is the zinc-silver peroxide system. The preferred Mg alloy-polyhalide reserve cell batteries have a distinct advantage over the Zn silver peroxide cells, as follows:

(1) A much higher operating voltage—2.0 vs. 1.5;
(2) A much lower cost;
(3) More abundant and widely distributed raw materials.

The flatness of the discharge curve is about the same for the two systems, and despite a less favorable theoretical electrochemical equivalence for the polyhalide cells, actual watt-hours obtained are greater than for the silver cell.

The following examples describe completely representative specific embodiments of the invention claimed and set forth the best mode contemplated by the inventors of carrying out their invention. They are not limitative of the invention, which is particularly pointed out and distinctly claimed in the claims.

EXAMPLE 1

A conventional general purpose test was used in which representative depolarizers were evaluated for primary dry cell use, discharge being 5 minutes per day. The conventional test requires that two "D" size cells in series be discharged through a resistance of 4.5 ohms to a cutoff voltage of 1.30. For the test herein, one "D" size cell was used and discharged through a 9 ohm drain to give the same current density as two cells with a 4.5 ohm drain.

Figure 2:
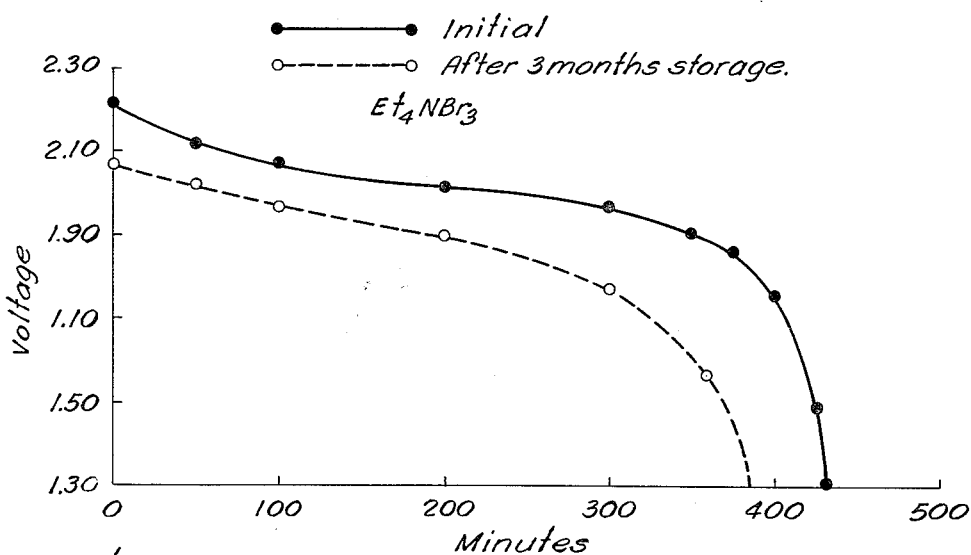

Discharge curves, plotted as voltage vs. minutes discharge, both initially and after 3 months' 70° F. storage, are shown in FIGURES 1 and 2. FIGURE 1 gives results with Dowex 1–×8 $ClBr_2$ resin, described hereinafter, and FIGURE 2 the results with $(C_2H_5)_4NBr_3$.

The dry cells were made according to the following formulations:

*Dowex 1–×8, $ClBr_2$ resin depolarized dry cell*

Anode: 0.050 in. wall, A.S.T.M. AZ31A magnesium alloy "D cell
Cathode: carbon rod, 5 g.
Dry cathode mix: 80 weight percent $ClBr_2$ resin * depolarizer, 50–100 mesh +5% $Na_2CrO_4$+15% acetylene black (ball-milled 5 minutes)
Electrolyte: water
Wetness: 660 ml. water/1000 g. dry cathode mix
Mix weight: 35 g. wetted mix (cathode mix+electrolyte)/cell
Separator: salt-free kraft paper
Top seal: high melting tar—tab vent $(C_2H_5)_4NBr_3$ *depolarized dry cell*

Same as above, except:

Dry cathode mix: 80% depolarizer ($Et_4NBr_3$)+as above
Electrolyte: 100 g./liter $MgBr_2$+0.25 g./liter $Na_2CrO_4$

EXAMPLE 2

A "D" size primary cell of the type described above was constructed using the following materials:

Anode: magnesium alloy can ("D" size) 23 g.
Cathode: carbon rod 5 g.
Separator: paper spacers 1 g.
Wet mix: 33 g., having the following composition:
  50% Dowex 1–×8, $I_3$ resin (63% iodine)
  41% water
  9% acetylene black.

The cell was assembled and sealed in the usual manner. It was then continuously discharged through an 8 ohm resistance.

This dry cell gave an average of 1.75 volts and 0.22 amps. for 468 minutes to a 20 percent voltage drop, or 180 watt-minutes. This compared with 1.5 volts and about 50 watt-minutes to a 20 percent voltage drop for a typical zinc "Leclanché" cell at the same 0.22 amp. drain under the same test conditions.

EXAMPLE 3

A "D" size primary cell of the type described above was made using the following materials:

Anode: "D" size A.S.T.M. AZ31A magnesium alloy can
Cathode: carbon rod, 5 g.
Dry cathode mix: 85 weight percent $Et_4NBr_3$+15% acetylene black
Electrolyte: aqueous 75 g./liter $MgBr_2$+1 g./liter $Na_2CrO_4$
Wetness: 660 ml. electrolyte/1000 g. cathode mix
Wet mix: 35 g. (electrolyte wetted cathode mix)

Figure 3:
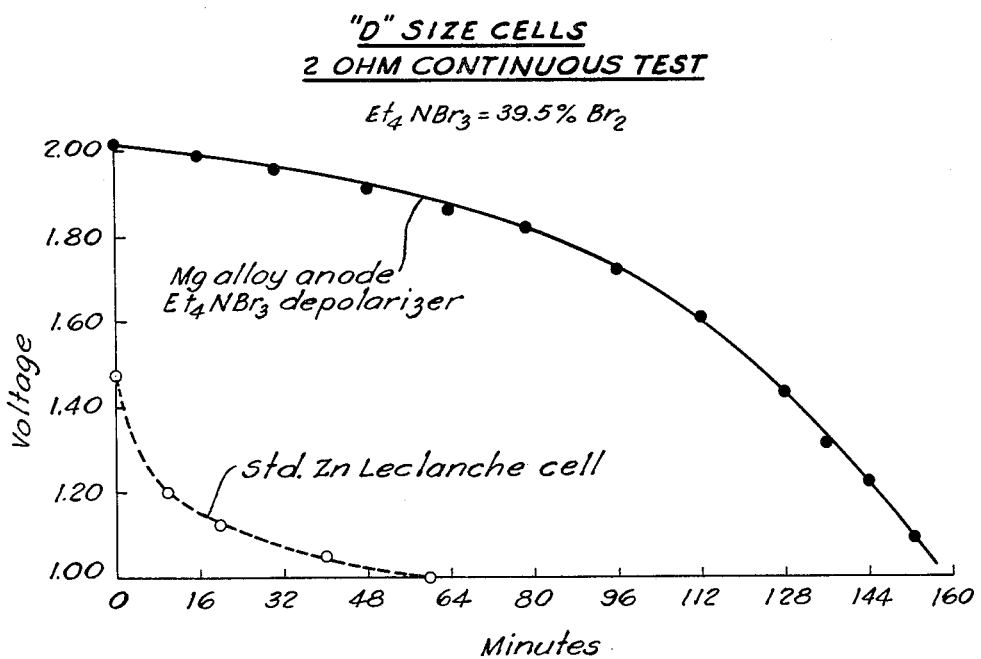

The cell was assembled and sealed in the usual manner. When discharged continuously through a 2-ohm load, it gave an average of 1.86 volts and 0.93 amps. for 194 watt-minutes. A 20 percent voltage drop from 2 volts to 1.6 volts took 112 minutes. In contrast thereto, a standard "D" size Zn Leclanche cell gave a 20 percent voltage drop in 13 minutes under the same discharge conditions. A comparison of the discharge curves plotting voltage drop vs. time in minutes for both the cell of this example and the standard Leclanche cell under the same 2-ohm drain is shown in FIGURE 3.

EXAMPLE 4

Figure 4:
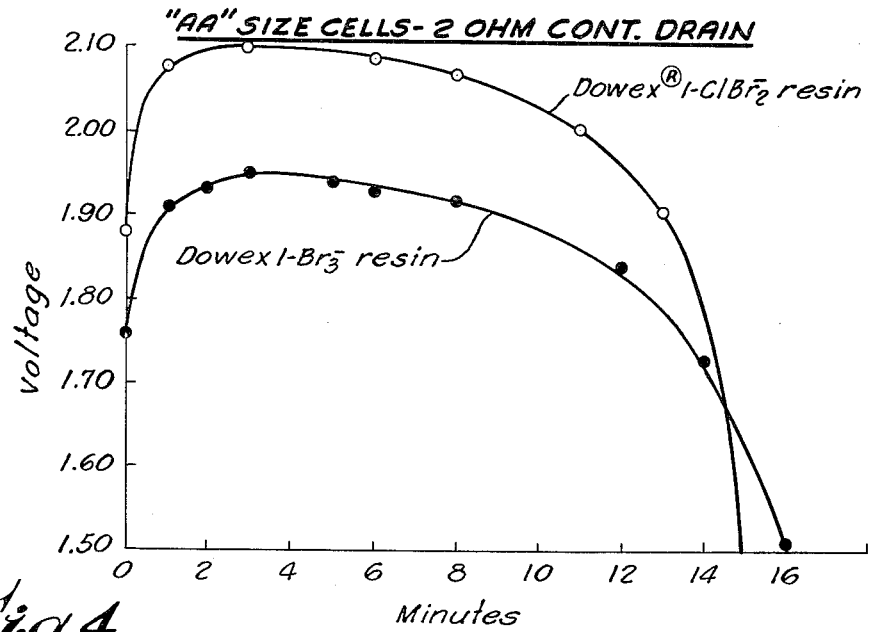
Figure 5:
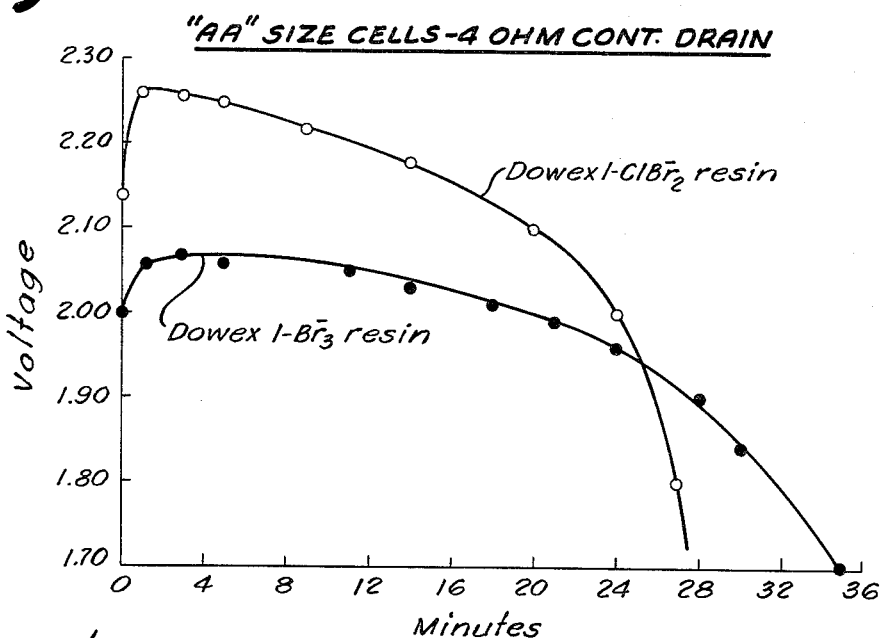
Figure 6:
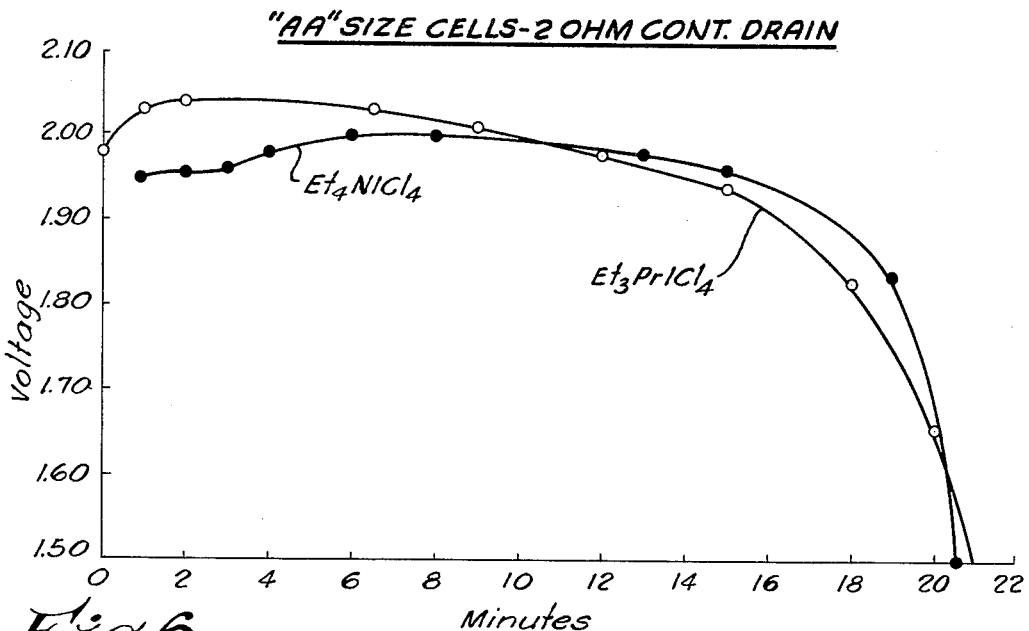
Figure 7:
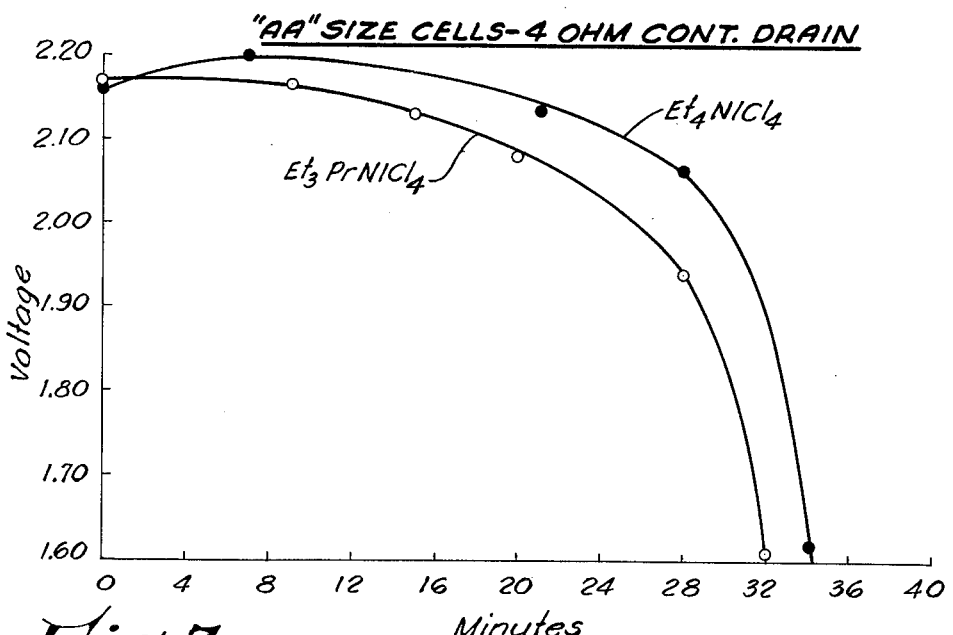

Two Dowex 1–×8 resins, 50–100 mesh, one a —$ClBr_2^-$ type, the other a —$Br_3^-$ type, were incorporated into "AA" size cells as depolarizers and tested in 2 and 4 ohm continuous tests to simulate a reserve-type cell for heavy drain use. FIGURES 4 and 5 graphically show the results obtained. FIGURES 6 and 7 give the results with similar cells, differing only as to their depolarizers, tetraalkylammonium —$ICl_4^-$. These cells were all made with the following components:

Anode: 0.032 in. wall "AA" size A.S.T.M. AZ10XA magnesium alloy cans

---

\* An approximately 8% divinylbenzene crosslinked poly (vinylbenzyl trimethylammonium chloride) resin converted to the —$ClBr_2$— form by addition of one mole of $Br_2$ per equivalent of chloride.

Cathode collector: carbon rod, 1.325 g.
Dry cathode mix: 85 weight percent depolarizer+15% acetylene black (ball milled)
Electrolyte*: water+0.25 g./liter $Na_2CrO_4$
Wetness: 660 ml. electrolyte/1000 g. cathode mix
Separator: salt-free kraft paper
Seal: high melting tar, 0.020 in. vent
Mix weight: as shown below for various depolarizers:

Dowex 1 —$ClBr_2^-$ 4.9 g. wet mix (electrolyte+cathode mix)/cell
  Dowex 1 —$Br_3^-$ 5.0 g. wet mix (electrolyte+cathode mix)/cell
  $Et_4NICl_4$† 4.3 g. wet mix (electrolyte+cathode mix)/cell
  $Et_3PrNICl_4$‡ 4.7 g. wet mix (electrolyte+cathode mix)/cell

What is claimed is:

1. A primary dry cell having a consumable metal anode selected from the group consisting of magnesium alloys and aluminum, an aqueous electrolyte and as an organic depolarizer a quarternary ammonium trihalide selected from the group consisting of poly[vinylbenzyl-N-$(R)_3(XY_2)^-$] and $R_4N(XY_2)^-$ wherein one R of the $R_4N(XY_2)^-$ is a member selected from the group consisting of alkyl, aralkyl and aryl substituents containing up to 20 carbon atoms and all of the other R's individually are alkyl substituents containing up to 4 carbon atoms, X is a halide and $Y_2$ is a member selected from the group consisting of $Br_2$ and $I_2$.

2. A primary dry cell as claimed in claim 1 having as an organic depolarizer a poly(vinylbenzyl trialkylammonium trihalide), the alkyl groups of which have 1 to 4 carbon atoms.

3. A primary dry cell as claimed in claim 1 having as an organic depolarizer a tetraalkylammonium trihalide, the alkyl groups of which have 1 to 4 carbon atoms.

4. A primary dry cell as claimed in claim 1 having as an organic depolarizer a poly(vinylbenzyl trimethylammonium $ClBr_2^-$).

5. A primary dry cell as claimed in claim 1 having as an organic depolarizer a tetraethylammonium tribromide.

6. A primary dry cell as claimed in claim 1 having as an organic depolarizer a poly(vinylbenzyl trimethylammonium tribromide).

7. A primary dry cell as claimed in claim 1 having a polymeric trihalide depolarizer which is crosslinked with up to about 16 weight percent of a diethylenically unsaturated crosslinking agent.

*Electrolyte is added immediately prior to cell use.
†Et=ethyl.
‡Pr=propyl.

8. A primary dry cell as claimed in claim 1 having a soluble chromate corrosion inhibitor.

9. A primary reserve cell having a consumable metal anode selected from the group consisting of magnesium alloys and aluminum, and as an organic depolarizer a quaternary ammonium polyhalide selected from the group consisting of poly[vinylbenzyl-N-$(R)_3(XY_n)^-$] and $R_4N(XY_n)^-$ wherein $n$ is one of the integers 2 and 4, one R of $R_4N(XY_n)^-$ is a member of the group consisting of alkyl, aralkyl and aryl substituents containing up to 20 carbon atoms and the other R's individually are alkyl substituents containing up to 4 carbon atoms, X is a halide and Y is a halogen selected from the group consisting of chlorine, bromine and iodine.

10. The primary reserve cell of claim 9 having as an organic depolarizer a poly(vinylbenzyl trialkylammonium polyhalide), the alkyl groups of which have 1 to 4 carbon atoms.

11. The primary reserve cell of claim 9 having as an organic depolarizer a tetraalkylammonium polyhalide, the alkyl groups of which have 1 to 4 carbon atoms.

12. The primary reserve cell of claim 9 having as an organic depolarizer a poly(vinylbenzyl trimethylammonium —$ClBr_2^-$).

13. The primary reserve cell of claim 9 having as an organic depolarizer a poly(vinylbenzyl trimethylammonium —$Br_3^-$).

14. The primary reserve cell of claim 9 having as an organic depolarizer a tetraethylammonium —$ICl_4^-$.

15. The primary reserve cell of claim 9 having as an organic depolarizer a triethylpropylammonium —$ICl_4^-$.

16. The primary reserve cell of claim 9 having as an organic depolarizer a polymeric polyhalide crosslinked with up to about 16 weight percent of a diethylenic crosslinking agent.

17. A primary reserve cell as claimed in claim 9 having a soluble chromate corrosion inhibitor.

References Cited by the Examiner

UNITED STATES PATENTS

| | | | |
|---|---|---|---|
| 2,786,088 | 3/1957 | Robinson | 136—83 |
| 3,073,884 | 1/1963 | Pinkerton | 136—100 |

OTHER REFERENCES

Arthur et al.: The Condensed Chemical Dictionary, 1956, page 963.

WINSTON A. DOUGLAS, *Primary Examiner.*

MURRAY TILLMAN, JOHN H. MACK, *Examiners.*